J. S. DA COSTA.
PRESSURE CONTROLLED CLOSURE.
APPLICATION FILED FEB. 15, 1918.

1,359,875.

Patented Nov. 23, 1920.
4 SHEETS—SHEET 1.

Witness
F. G. Campbell

Inventor
James Starr Da Costa,

By C. J. Stockman
Attorney

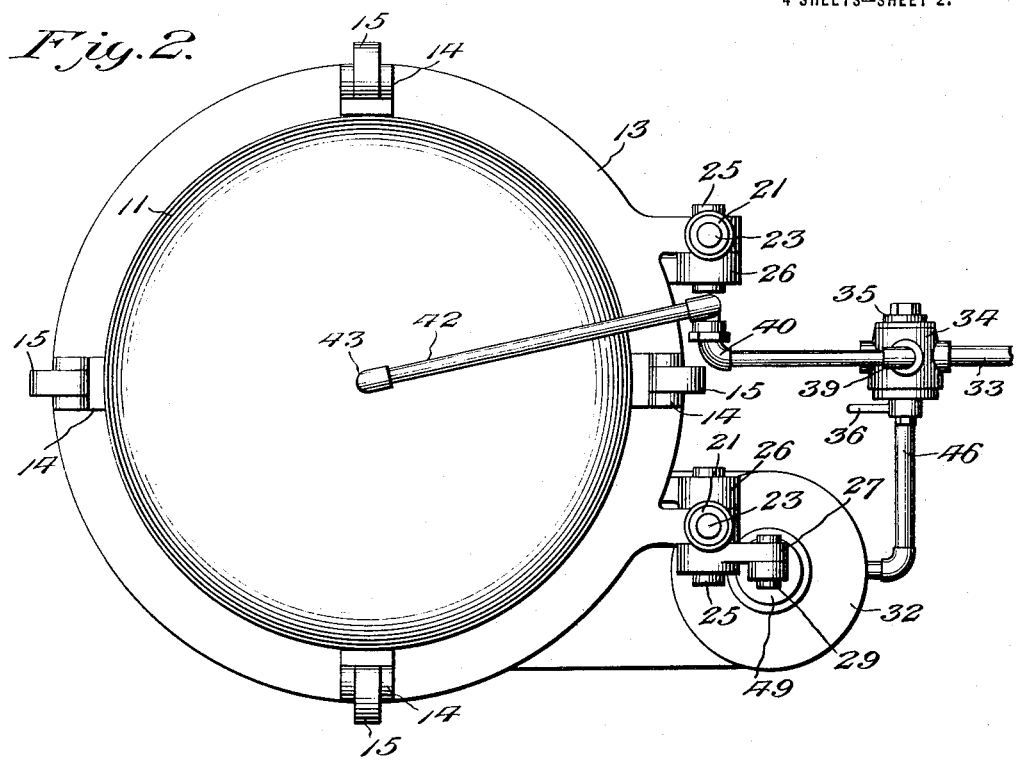

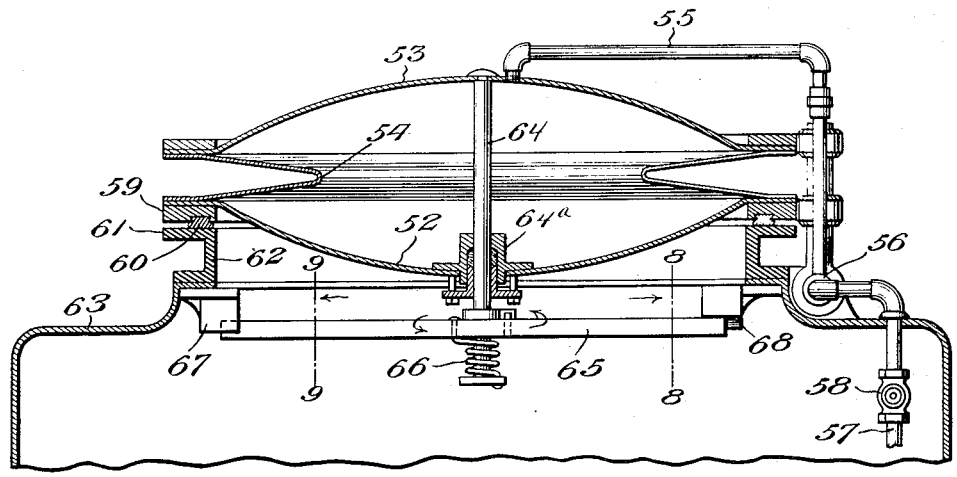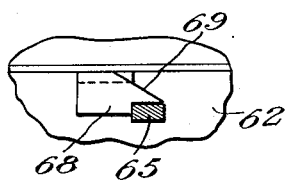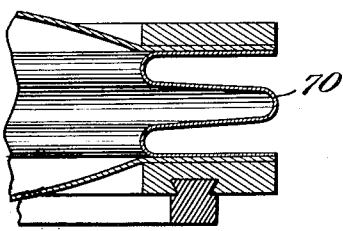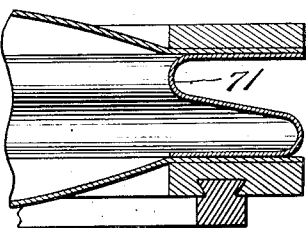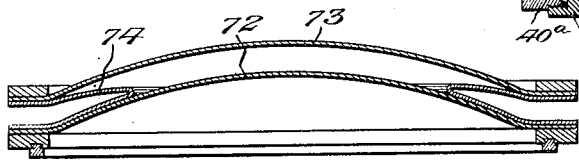

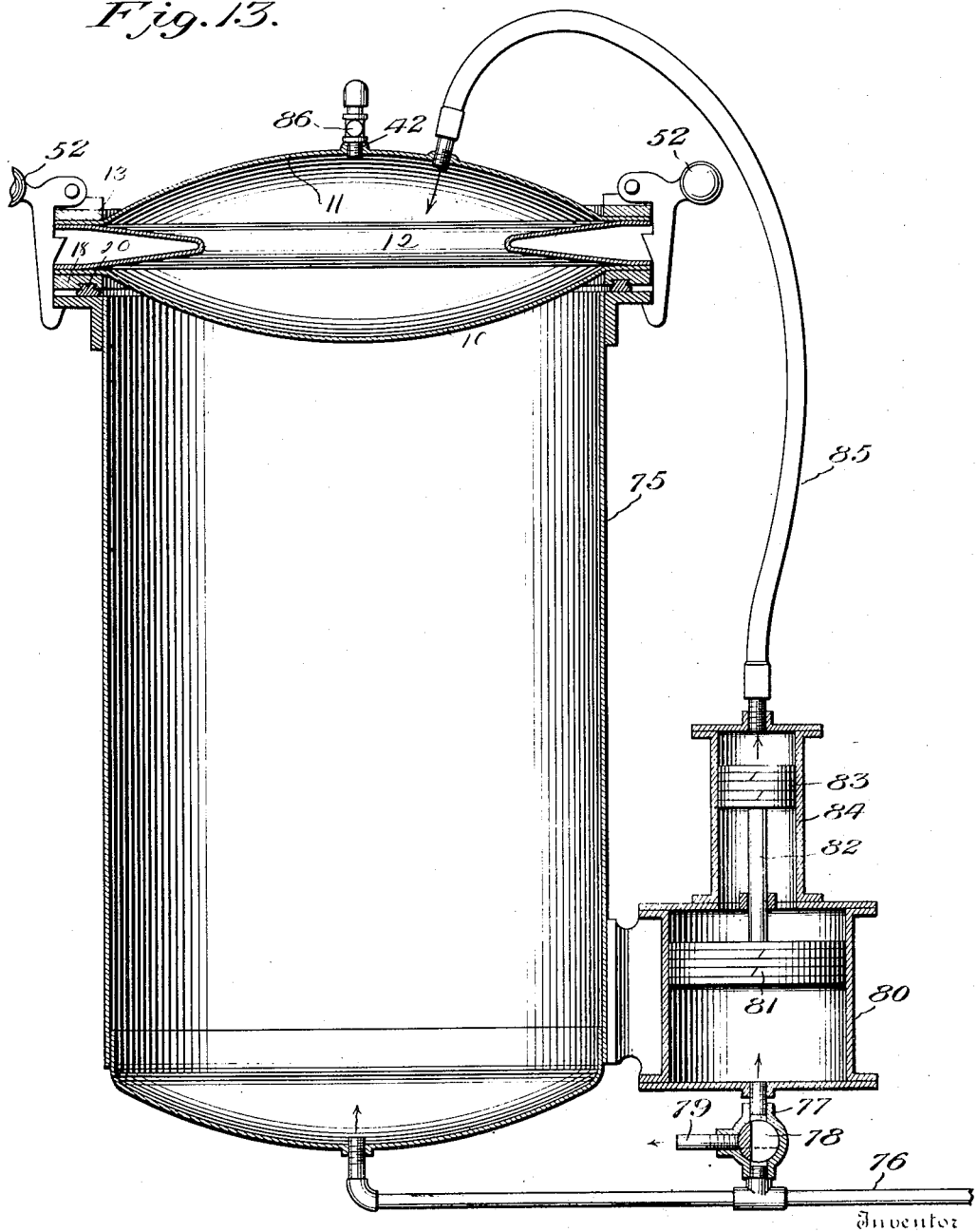

UNITED STATES PATENT OFFICE.

JAMES STARR DA COSTA, OF PHILADELPHIA, PENNSYLVANIA, ASSIGNOR OF ONE-HALF TO JOHN M. ALVEY, OF LOUISVILLE, KENTUCKY.

PRESSURE-CONTROLLED CLOSURE.

1,359,875.  Specification of Letters Patent.  Patented Nov. 23, 1920.

Application filed February 15, 1918. Serial No. 217,453.

*To all whom it may concern:*

Be it known that I, JAMES STARR DA COSTA, a citizen of the United States, residing at Philadelphia, in the county of Philadelphia and State of Pennsylvania, have invented certain new and useful Improvements in Pressure-Controlled Closures, of which the following is a specification.

This invention relates to pressure controlled closures its object being to provide a closure of general application useful in any relation where a tight closure is demanded.

Among the uses to which the closure may be put is the closing and sealing of digestors, stills, vats, sterilizers, cooking and preserving kettles, hatches, (such as submarine hatches for example), water-tight bulkhead doorways, and many others. It will be apparent as this description proceeds that the field of usefulness of the invention is almost unlimited and that it is capable of use in many relations other than those named.

Broadly stated the invention comprises a two-part head movable into position to close an opening in an element (such as a tank or the like) one of said parts having means adapted to engage said element to be held against movement with relation thereto and the other of said parts being then movable under the influence of fluid pressure admitted between the heads, into tight engagement with the element.

The invention further comprises pressure actuated means for moving the closure as a whole to open position together with a manually operable controlling element which complementally controls the pressure to the head and to the said pressure actuated means in such manner that the pressure in the head will be relieved before pressure is admitted to the pressure actuated means when the closure is to be opened. Means are also provided whereby the pressure in the pressure actuated means will be released and the closure moved to closed position before pressure is admitted to the head for the purpose of expanding the same into forcible engagement with the element.

A further object of the invention is to provide an intensifier for use in conjunction with tanks, stills, etc., in which considerable internal pressure is carried which intensifier serves the function of transmitting the said internal pressure to the interior of the two-part head at a pressure above that carried in the tank, still, etc., to thereby insure that the pressure in the head will be in excess of that carried in the tank.

Other objects and advantages of the invention will be set forth in the detailed description which now follows:

In the accompanying drawings—

Fig. 2 is a plan view thereof;

Fig. 3 is a detail sectional view illustrating one of the latches hereinafter described, in the position it occupies when the head is collapsed;

Fig. 4 is a view partly in side elevation and partly in section illustrating the sliding connections between the inner and outer members of the head or closure;

Fig. 5 is a detail sectional view of a controlling valve hereinafter described illustrating the valve in position to exhaust the head or closure;

Fig. 6 is a like view of the valve illustrating the valve moved to position to supply pressure to the cylinder which serves to move the head to open position.

Fig. 7 is a sectional view illustrating a type of construction that may be employed in closing the hatches of submarine boats or other man hole openings;

Fig. 8 is a sectional view upon line 8—8 of Fig. 7;

Fig. 9 is a sectional view upon line 9—9 of Fig. 7;

Figure 1:
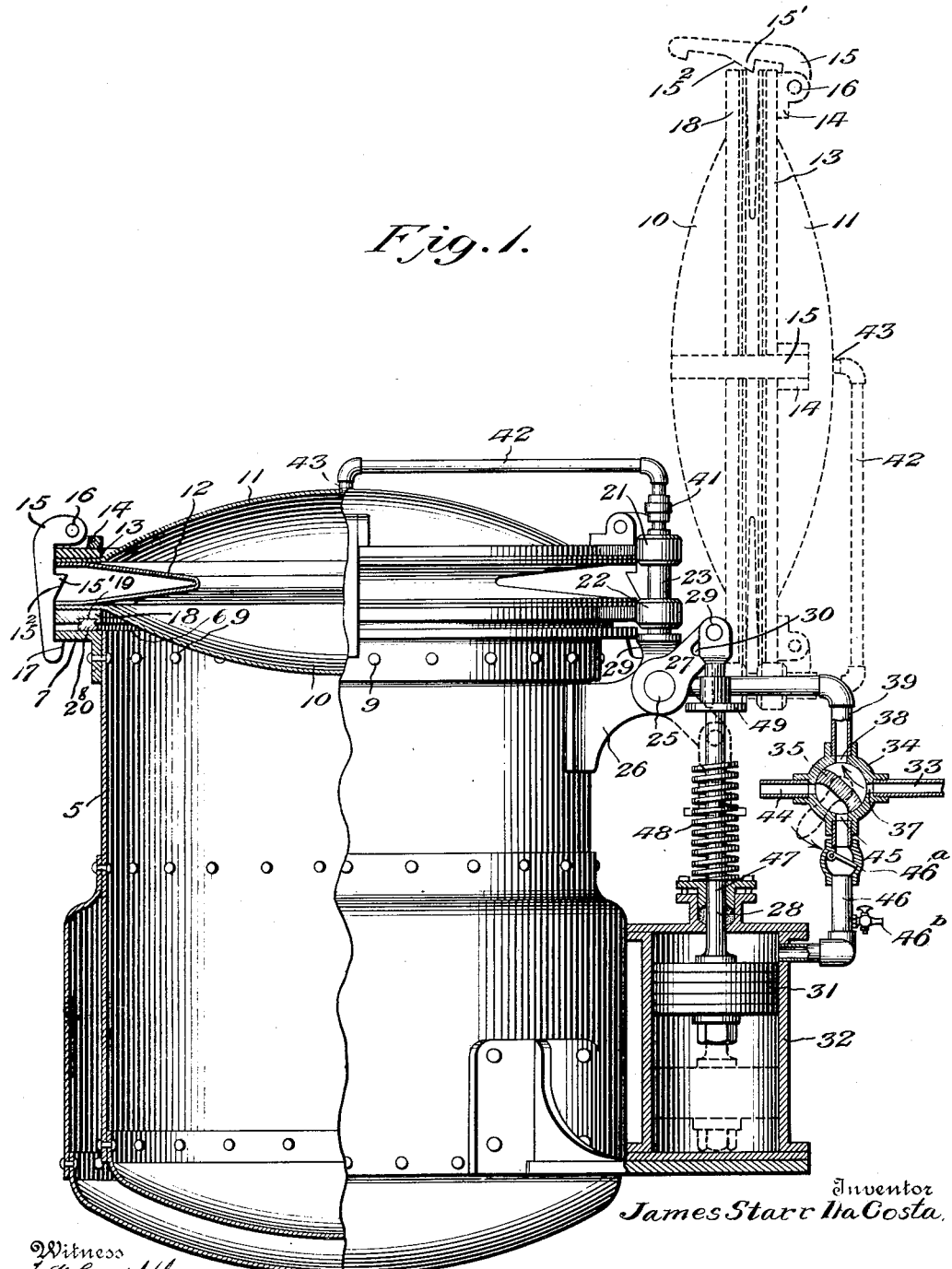
Figure 1 is a view partly in side elevation and partly in section of a closure constructed in accordance with the invention and an associated tank.

Figs. 10, 11, and 12 represent varying types of flexible connecting elements between the inner and outer members of the head;

Fig. 13 is a detail sectional view illustrating an intensifier which may be employed for the purpose of utilizing the pressure within the tank or still for delivering an increased pressure upon the head to thereby insure that the pressure within the head will always exceed the pressure within the tank, or still, or other element to which the closure is applied.

Like numerals designate corresponding parts in all of the figures of the drawings.

Referring to the drawings and particularly to Fig. 1, 5 designates a tank of any suitable size and shape, having an open end 6 surmounted by an outstanding flange 7 which in the present case is formed by an L-shaped angle 8 secured to the tank by rivets 9 or by any other suitable securing means.

The closure constituting the subject matter of the present invention consists of a head embodying an inner shell 10, an outer shell 11, and an endless intermediate diaphragm or bellows 12 the latter being made of such nature as possesses sufficient flexibility to permit movement of the inner and outer rigid shells 10 and 11 toward and from each other. The shell 11 carries a stiffening and strengthening ring 13 and this ring in turn carries bearing blocks 14 upon which latches 15 are pivoted at 16. These latches have hooked terminal ends 17 adapted to engage beneath the flange 7 as hereinafter set forth. The shell 10 carries a stiffening and strengthening ring 18 having a dove tail recess 19 formed in its under face for the reception of an annular gasket 20, said gasket being preferably formed of rubber or other compressible material. The rings 13 and 18 carry bearing bosses 21 and 22 through which pins 23 pass. The bosses 21 are capable of vertical movement with respect to the pins 23 to thereby permit shell 11 to move toward and from the shell 10 as will be hereinafter described. The pins 23 carry heads 24 that are fixed to stub shafts 25. These stub shafts are journaled in bearing brackets 26 that are secured to the tanks. One of the stub shafts 25 carries a crank arm 27 and one end of a piston rod 28 has a pin and slot connection 29—30 with this crank arm. The other end of the piston rod carries a piston 31 that is movable in a cylinder 32. A pressure supply pipe 33 (see Figs. 1 and 2) leads to a valve casing 34. This valve casing is provided with a central plug 35 to which a turning motion may be imparted by a handle 36. The valve casing 34 has a port 37 which establishes communication between the pressure supply pipe 33 and the interior of the valve casing. A port 38 establishes communication between the interior of the valve casing and a pipe 39, the latter being connected by suitable pipe connections which include a swivel joint 40 and a sliding or expansion joint 41, with a pipe 42 that leads into the head through the shell 11 at 43.

The valve casing 34 is further provided with an exhaust port 44 and with a port 45 which through pipe connections 46 is in communication with the cylinder 32 above the piston 31. A check valve 46ª which opens toward the cylinder is disposed in the pipe 46 and a cock or valve 46ᵇ of such small size as to constitute a slow flowing valve is disposed in pipe 46 below the check valve. The piston rod 28 moves through a suitable stuffing box 47 and a spring 48 surrounds the piston rod above the stuffing box and is adapted to engage with a collar 49 to impart an initial closing movement to the head or closure as hereinafter set forth.

It will be apparent that if the head or closure be moved from the dotted line position to the full line position illustrated in Fig. 1 to bring the gasket 20 into contact with the flange 7, and that if pressure be then admitted from pipe 33 to the interior of the head the shell 11 will begin to move away from the shell 10, the expansible nature of the diaphragm or bellows permitting this movement while retaining the pressure within the head. Upon initial movement of the shell 11 away from the shell 10 the latches 15 will move from the position illustrated in Fig. 3 to the position illustrated in Fig. 1 or in other words until the hooks 17 engage beneath the flange 7. This movement of the latches is due to the fact that as the shells 10 and 11 separate, a space is formed into which projections 15' of the latches may move. These projections have inclined faces $15^2$ by which the latches are thrown outwardly to the position illustrated in Fig. 3 when the head is collapsed.

While the force of gravity may be relied upon to move the latches into engagement with the flange 7 I may, if desired, provide additional means for aiding in this movement such for example as springs 50 (see Fig. 3), said springs bearing between rings 13 and pins 51 carried by the latches. Or if desired, the latches may be additionally weighted as by the offset weights 52 (see Fig. 13). However it is to be understood that any suitable means for actuating these latches may be employed since numerous ways of accomplishing this end will readily suggest themselves to those skilled in the art. The particular arrangement to be employed will depend upon the conditions under which the device is being utilized and will also depend in some measure upon whether the head is being used upon a horizontal tank or upon a vertical tank.

It will be readily understood that when the hooks 17 are engaged beneath the flanges 7 and the rigid shell 11 is thereby held against movement away from the tank 5, the admission of pressure to the interior of the head between the shells 10 and 11 will result in forcing the shell 10 toward the tank and will result in forcibly compressing the gasket 20 against the flange 7 in such manner that the pressure will be equalized over the entire area of the contacting face of said gasket.

It will of course be understood that when it is desired to swing the closure to open position the pressure within the head must be relieved and the head must be collapsed to release the latches from the flange 7 before pressure is admitted to the cylinder 32.

To this end the valve plug 35 is so shaped and the several ports of the valve casing are so arranged that the foregoing objects will be accomplished. When it is desired to close the head the valve 46ᵇ is opened which permits the pressure above piston 31 to gradually escape and the head to gently close. If valve plug 35 be now moved to the position illustrated in Fig. 1, pressure may pass to the interior of the head to force shell 10 and gasket 20 toward flange 7. Check valve 46ᵇ prevents the escape of the pressure fluid except through the slow flowing valve 46ᵃ. Upon moving the valve plug 35 to the position illustrated in Fig. 5 the port 37 of the supply pipe is closed entirely and the port 38 is brought into communication with the exhaust 44, thus relieving the pressure within the head and causing the head to collapse to the position illustrated in Fig. 3 with the result that the latches 15 are disengaged from the flange 7. If the valve be then moved to the position illustrated in Fig. 6, communication will be established between the ports 37 and 45 and pressure will be admitted to cylinder 32 above the piston 31 to thereby force the piston downwardly, and, through the crank arm 27 associated therewith, throw the head or closure to the open or dotted line position illustrated in Fig. 1.

In order to prevent admission of steam or other pressure fluid, to the head when the head is in open position, the expansion joint 40 (see Fig. 14) is of novel construction. This joint comprises the members 40ᵃ and 40ᵇ adapted to turn with relation to each other, the member 40ᵇ having a head 40ᶜ which is forced toward the member 40ᵃ by a nut 40ᵉ. A ground joint is provided at 40ᶠ. The members 40ᵃ and 40ᵇ are bored at such an angle that the openings at their abutting faces are off center and these openings register with each other when the head is in its closed position but do not register with each other when the head is in its open position.

The form of the invention illustrated in Fig. 7 is particularly adapted for use in closing man-hole openings, such, for example as the hatches upon submarine boats. When used in such relation as this it is not desirable to have the latches disposed outwardly of the structure where they would be subjected to the action of the elements. When used in the relation indicated I prefer to employ a latching mechanism which will have its working parts disposed inside of the element that is closed by the closure forming the subject matter of the present invention. One form of such latch is illustrated in Fig. 7 where 52 designates the inner shell, 53 designates the outer shell and 54 designates the diaphragm or bellows of the closure. A pressure supply pipe 55 which may enter the head at any suitable point is connected by a swivel joint 56 with a source of pressure supply indicated at 57. A controlling valve 58 provides means for admitting pressure to the head. The manner of hinging the head for swinging movement is the same in this form of the invention as in that previously described. The head 52 carries a stiffening ring 59 which is recessed to receive a gasket 60 adapted to have a seating upon a flange 61 of a channel ring 62. This ring may constitute a part of the conning tower or other portion of the hull 63 of a submarine boat. The shell 53 carries a stem 64 which slides through a stuffing box 64ᵃ carried by the shell 52 and this stem carries a transverse bar 65 the ends of which are adapted to move, under the influence of a spring 66, beneath blocks 67 and 68. The blocks have inclined faces 69 which, when the cover moves to closed position, engage the opposite ends of the bar 65 and by reason of their inclination impart a slight partial rotation to the bar 65 against the tension of the spring, 66, but as soon as the bar 65 moves downwardly far enough said spring acts to turn the bar to cause its ends to engage beneath the blocks 67 and 68 (see Figs. 8 and 9). This holds the shell 53 against movement away from the shell 52, with the result that when pressure is admitted between these shells, shell 52 and gasket 60 will be moved forcibly toward the flange 61.

Figs. 10 and 11 illustrate diaphragms or bellows 70 and 71 of different form from those shown in Figs. 1 and 7, these figures being intended to make it clear that diaphragms of varying forms and shapes may be employed, it being only necessary to provide in this relation some construction which will permit movement of the two shells of the head with respect to each other, while retaining the pressure between them.

In Fig. 12 I have illustrated a closure comprising inner and outer shells 72 and 73 respectively, both of which are bowed outwardly instead of one of said shells being bowed inwardly as in Figs. 1 and 7. Otherwise the construction is substantially the same as that heretofore described, the diaphragm or bellows in this case being indicated at 74.

It is frequently the case that it is desired to employ closures of this nature upon tanks, stills, driers or the like in which considerable internal pressure is maintained and it therefore becomes desirable to provide means to insure that the pressure in the head will always be in excess of the pressure within the tank or the like, since, if the pressure in the tank exceeded the pressure in the head the gasket would be moved out of engagement with the adjacent portion of the tank. To accomplish the foregoing result I propose to employ an intensifier which will use the tank pressure or pressure from the same source that the tank derives its pressure from, and which intensifier will act upon the pressure within the head to maintain it greater than the pressure within the tank. To this end the tank 75 (see Fig. 13) has its pressure supply pipe 76 provided with a branch 77 in which a valve 78 is located. An exhaust port 79 leads from this valve and the valve is of such shape as to establish communication between the pressure supply pipe 76 and a cylinder 80 or to establish communication between the cylinder 80 and the exhaust port 79. The cylinder 80 is of considerable area and has a piston 81 movable therein which piston carries a piston rod 82, which in turn carries a piston 83 movable in a cylinder 84 that is much smaller in diameter than the cylinder 80. Consequently the piston 81 is much greater in area than the piston 83. The space within the cylinder 84 above the piston 83 is connected by any suitable means, such for example, as a flexible tube 85, with the interior of the head or closure, this head or closure being substantially the same in construction as that illustrated in Fig. 1 and the same reference characters being applied thereto. It will be understood that until the head is closed and pressure is admitted to tank 75 the valve will be moved to such position as to shut off communication between pipe 76 and cylinder 80. But after the head has been closed the valve will be moved to establish communication between pipe 76 and cylinder 80. This will force the piston 81 upwardly and because of the great area of piston 81 will cause the piston 83 to create a pressure within the head greater than the pressure in pipe 76. To prevent the pressure within the head from flowing back through pipe 42, until the pressure in the head is equalized with the pressure in the pipe 33 I may provide a check valve 86 which will permit the pressure fluid to flow into the head but will not permit the pressure fluid to pass therefrom through pipe 42.

Many advantages will result from the use of the present invention among which will be a very great saving of time, labor and expense. It is apparent that a gasket of expensive material, such as rubber, of sufficient size to seal a large tank or still, is quite expensive, and yet under the method now employed for sealing tanks, stills and the like these gaskets have but a very short life. In most cases the head is drawn down and the gasket compressed by the use of spaced bolts. Frequently these gaskets blow out between the bolts and in other cases the gaskets are so badly damaged in opening the tanks or stills as to be rendered useless. Furthermore the bolts have to be screwed down so tightly in order to secure a joint that will retain the internal pressure of the tank that the task of either opening or closing the tank is quite a laborious one. In some stills it requires more than an hour to close the head and even longer to open the same. By the use of the present invention a tight closure may be effected in a few minutes' time, and in such manner that no injury to the gasket will result because the pressure will be uniform over its entire contacting surface.

It is to be understood that the embodiment of the invention illustrated in the accompanying drawings is intended to be merely illustrative, for the apparatus employed may take many forms and it is therefore to be understood that the invention is not limited to the precise construction set forth but that it includes within its purview whatever changes fairly come within the spirit of the appended claims.

What is claimed is:

1. The combination with an element having an opening to be closed, of a two-part, pressure retaining closure, means to prevent movement of the outer part away from the said element and means for introducing pressure fluid between the parts of the closure to force the inner of said parts toward the element by the direct action of the pressure fluid thereon.

2. A structure as recited in claim 1 having a gasket disposed between the inner part of the closure and the element.

3. A closure of the character described, comprising rigid inner and outer shells, an expansible peripheral connecting element between them, and means for introducing pressure fluid therebetween.

4. The combination with an element having an opening to be closed, of a collapsible two-part closure, and means carried by one of said parts for engaging said element to resist movement of said part away from the element when pressure fluid is introduced between said parts to act directly upon the other of said parts to force it to closed position with respect to the element.

5. The combination with an element having an opening to be closed, of a pressure retaining closure comprising a pair of rigid members and a connecting expansible member, means carried by one of said members for engaging the element to resist movement of said member with relation thereto when pressure is introduced between said rigid members and means for automatically effecting a disengagement of the last named means when the pressure is released and the closure is collapsed.

6. The combination with an element having an opening to be closed, of a collapsible two part closure comprising rigid inner and outer members, latches carried by the outer of said members for engaging said element to resist movement of said member with relation to the element when pressure fluid is introduced between said members and means for introducing pressure fluid between said members, to act directly upon the inner member at all points of the circumference thereof, to force the same into engagement with said element.

7. The combination with an element having an opening to be closed, of a collapsible two part closure comprising rigid inner and outer members both substantially co-extensive in diameter with the element, latches carried by the outer of said members for engaging said element to resist movement of said member with relation to the element when pressure fluid is introduced between said members, means for introducing pressure fluid between said members, to force the inner of said members into tight engagement with the element by the direct action of the pressure fluid over the entire circumference thereof, and means carried by said latches for effecting a disengagement thereof from said element when the closure collapses.

8. The combination with an element having an opening to be closed, of a collapsible two part closure comprising rigid inner and outer members both substantially co-extensive in diameter with the element, latches carried by the outer of said members for engaging said element when pressure fluid is introduced between said members, means for introducing pressure fluid between said members, to force the inner of said members into tight engagement with the element by the direct action of the pressure fluid over the entire circumference thereof, means normally tending to move said latches to engaging position and means for effecting disengagement of said latches against the action of the last named means upon collapse of the closure.

9. The combination with an element having an opening to be closed, of a collapsible two part closure mounted for swinging movement with respect to said element and operable to seal the element by the direct action of pressure introduced therein, a pressure operated means for actuating said closure to move it to open or closed position with respect to the element, a source of power, a connection between said source of power and the pressure operated means and a connection between the source of power and the collapsible closure.

10. The combination with an element having an opening to be closed, of a collapsible two part closure mounted for swinging movement with respect to said element and operable to seal the element by the direct action of pressure introduced therein, a pressure operated means for actuating said closure to move it to open or closed position with respect to the element, a source of power, a connection between said source of power and the pressure operated means, a connection between the source of power and the collapsible closure and a controlling valve common to both the last named connections.

11. The combination with an element having an opening to be closed, of a collapsible two part closure and operable to seal the element by the direct action of pressure therein, a power cylinder, a piston operable therein, connections between said piston and the closure whereby movement of the piston moves the closure to open or closed position with respect to said element, means for introducing pressure fluid to said cylinder and means for introducing pressure fluid to said closure.

12. The combination with an element having an opening to be closed, of a collapsible two part closure, a power cylinder, a piston operable therein, connections between said piston and the closure whereby movement of the piston moves the closure to open or closed position with respect to said element, means for introducing pressure fluid to said cylinder and means for introducing pressure fluid to said closure, said means embodying a common controlling valve for the cylinder and the closure.

13. The combination with an element having an opening to be closed, of a collapsible two part closure and operable to seal the element by the direct action of pressure therein, a power cylinder, a piston operable therein, connections between said piston and the closure whereby movement of the piston moves the closure to open or closed position with respect to said element, means for introducing pressure fluid to said cylinder and means for introducing pressure fluid to said closure, said means being constructed to exhaust the head before admitting pressure to the cylinder.

14. The combination with an element having an opening to be closed, of a collapsible head therefor and operable to seal the element by the direct action of pressure therein, a power cylinder, connections operable to effect an opening of the head when pressure is admitted to the power cylinder, and means for exhausting said cylinder comprising a slow flowing valve to thereby insure a gentle closing of the head.

15. The combination with an element having an opening to be closed of a collapsible two part closure, means for introducing pressure fluid to said closure, a hinged mounting for said closure, a cylinder, a pressure operated piston therein, a connection between the piston and the closure for actuating the closure when pressure is admitted to said cylinder, a pressure supply pipe and a common controlling valve between said pressure supply pipe and the cylinder and between the pressure supply pipe and the head and means for exhausting the cylinder comprising a slow flowing valve, said common controlling valve being constructed to exhaust the head before admitting pressure to the cylinder.

16. A closure of the character described comprising rigid inner and outer members and an expansible pressure retaining element therebetween, latches carried by one of said parts and projections carried by said latches which act to impart movement to said latches out of disengaging position as the head collapses and the outer part thereof moves toward the inner part thereof.

17. A two part closure comprising rigid inner and outer shells and an expansible connecting element therebetween, latches pivotally mounted upon the outer of said shells and projections having inclined faces carried by said latches which projections ride over the adjacent portions of the inner shells as the closure collapses to thereby throw the latches outwardly to disengaging position.

18. The combination with an element having an opening to be closed, of a hollow pressure actuated head of such area as to close said opening and of such flexibility as to permit expansion thereof under the introduction of pressure therein and means for introducing pressure into said head to force a part thereof into tight engagement with a part of said element by the direct action of the pressure throughout the area of said head.

19. The combination with an element having an opening to be closed of a closure comprising rigid inner and outer shells and a flexible connecting element therebetween, a stem connected to the outer of said shells, a stuffing box carried by the inner of said shells through which said stem moves, means for introducing pressure between said shells and a bar carried by said stem and of such length as to substantially span the opening to be closed and members beneath which the ends of said bar engage to thereby hold said bar and the outer shell against movement away from said element.

In testimony whereof I affix my signature.

JAMES STARR DA COSTA.